United States Patent [19]
Pelgrim et al.

[11] Patent Number: 5,690,080
[45] Date of Patent: Nov. 25, 1997

[54] FUEL HEATER FOR HEATING LIQUID FUEL UNDER PRESSURE FOR AN INTERNAL INJECTION ENGINE

[75] Inventors: Robertus J. Pelgrim, Borne; Arnold M. Brouwers, Wierden; Edward E. Grutterink, Aadorp; Daniel van't Veen, Borne; Arthur A. Pouwels, Albergen, all of Netherlands

[73] Assignee: Texas Instruments Incorporated, Dallas, Tex.

[21] Appl. No.: 503,170

[22] Filed: Jul. 17, 1995

[30] Foreign Application Priority Data

Jul. 7, 1995 [NL] Netherlands ............... 9401209

[51] Int. Cl.⁶ .................................. F02M 31/00
[52] U.S. Cl. ........................................ 123/549
[58] Field of Search ........................ 123/549, 557; 219/201, 202, 209

[56] References Cited

U.S. PATENT DOCUMENTS

| | | | |
|---|---|---|---|
| 4,501,255 | 2/1985 | van der Ploeg et al. | 123/557 |
| 4,508,957 | 4/1985 | Rocchitelli. | |
| 4,628,889 | 12/1986 | Van Der Ploeg | 123/549 |
| 4,834,053 | 5/1989 | Van Der Ploeg et al. | 123/549 |
| 4,898,142 | 2/1990 | Van Wechem et al. | 123/549 |
| 5,050,569 | 9/1991 | Beunk et al. | 123/549 |
| 5,054,458 | 10/1991 | Wechem et al. | 123/549 |
| 5,218,943 | 6/1993 | Takeda et al. | 123/549 |

FOREIGN PATENT DOCUMENTS

| | | |
|---|---|---|
| 0247697 | 12/1987 | European Pat. Off. . |
| 3320903 | 2/1985 | Germany . |
| 8800731 | 10/1989 | Netherlands . |

OTHER PUBLICATIONS

Patent Application No. DE–OS 2800894, Application Date 01-10-78.

*Primary Examiner*—Marguerite McMahon
*Attorney, Agent, or Firm*—Russell E. Baumann; Richard L. Donaldson; Rene' E. Grossman

[57] ABSTRACT

A fuel heater for heating liquid fuel under pressure for use in an injector system-injection engine includes a pill 5 made of material with positive temperature coefficient (PTC) with a heatsink member 6, 7 covering both the top and bottom surface of the pill. At least one narrow, preferably spiral-shaped groove 15, 16 extends on either side of the PTC pill, either in the PTC material or in the heatsink material, or in both materials to carry fuel supplied under pressure. The fuel flows into the groove at one side of the pill from a central region of the pill towards the edge of the pill, and then into the groove at the other side of the pill from the edge towards the central region while being heated by the pill. The narrow groove restricts the flow of fuel to keep it under pressure while being heated which then, in turn, provides for the fuel to abruptly convert from a liquid to a gaseous state upon exiting the injector system.

8 Claims, 1 Drawing Sheet

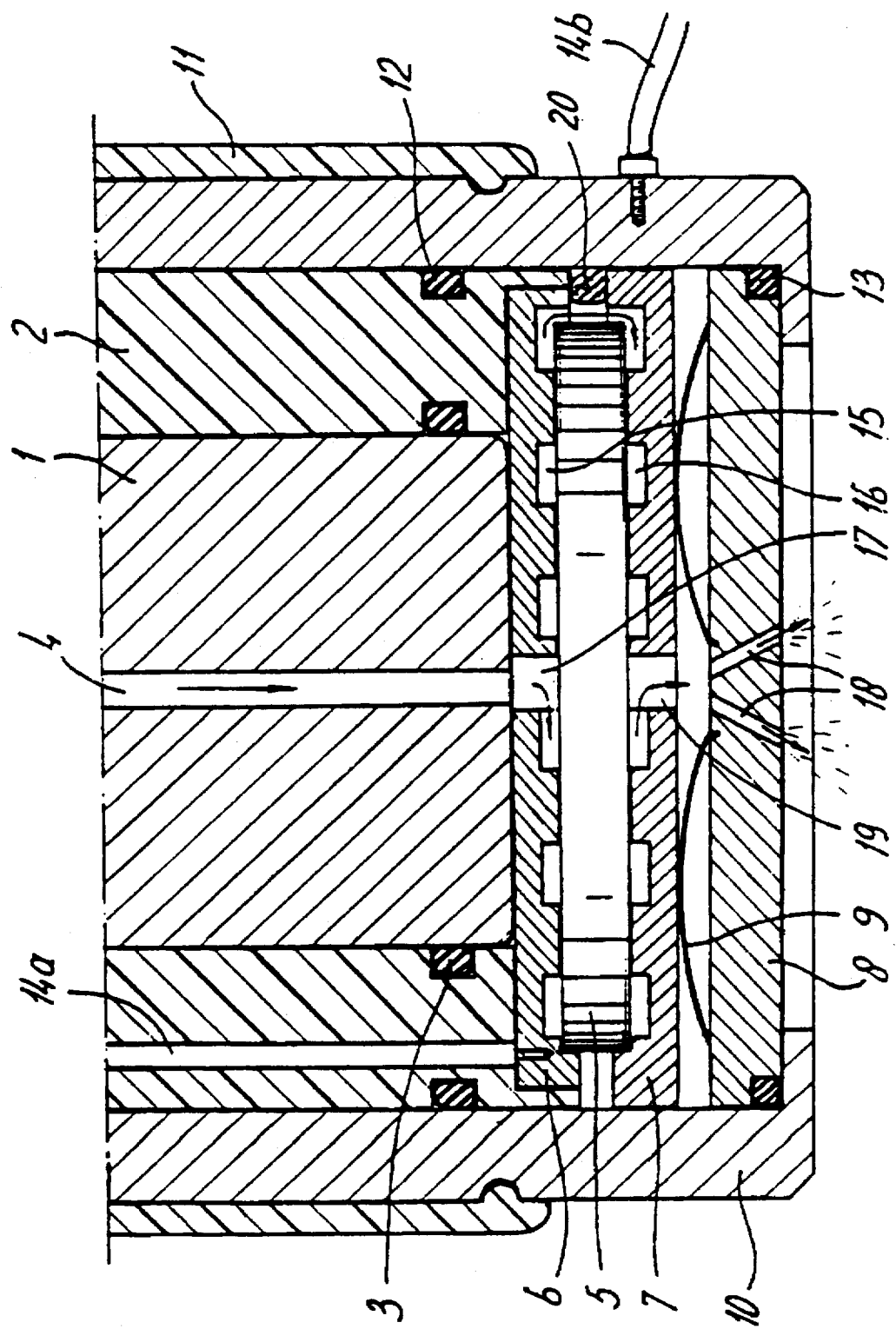

FUEL HEATER FOR HEATING LIQUID FUEL UNDER PRESSURE FOR AN INTERNAL INJECTION ENGINE

This invention relates to a fuel heater for an internal combustion engine; and, more particularly, a fuel heater for an internal combustion engine using an injection system.

BACKGROUND OF THE INVENTION

It has been known to use a fuel heater in an internal combustion engine to reduce the emissions of harmful substances, especially during cold start. The object of the heating is to better provide for the conversion of the fuel from a liquid substance to gaseous state for more complete combustion.

German Patent Specification 2800894 describes a method for the immediate and full conversion of fuel from a liquid substance to a gaseous state. The method utilizes the properties of retrograde substances such as gasoline. The gasoline is brought to a specific temperature and a specific initial pressure, and is then reduced to a lower specific end pressure with the initial temperature being chosen so that the gasoline at the lower pressure state is in a gaseous state. The system for carrying out the method of this patent, however, has certain drawbacks such as the possible formation of vapor lock in the injection valve. Additionally, the system is not intended for dynamic, demand-responsive control of the fuel heating in accordance with the particular characteristic-dependent engine operation state, with the result that the efficiency is necessarily considerably impaired, especially in transitional states.

SUMMARY OF THE INVENTION

Accordingly, an object of the present invention is to provide a fuel heater for the improved atomization of fuel. Such a fuel heater provides for the immediate conversion of fuel from the liquid to the gaseous state in an efficient manner.

It is a further object of the present invention to provide a fuel heater which can be fitted easily at the end of a fuel injector, and heats only the liquid fuel and not generally the surrounding air.

It is still another object of this invention to design a heating device in such a way that the heat transfer surface is relatively large and the power losses are minimal.

More specifically, the fuel heater for heating liquid fuel under pressure in an internal combustion injection engine of the present invention comprises a pill made of material with a positive temperature coefficient (PTC) having a top side and a bottom side surface with at least one of said top and bottom side surfaces covered by a heatsink, characterized in that at least one narrow groove is contained adjacent each of the top and bottom side surfaces in at least said PTC pill or said at least one heatsink so that the fuel supplied under pressure can flow in the at least one narrow groove at the top side surface of the pill from the central region towards the edge of the pill, and then into the at least one narrow groove at the bottom side surface of the pill from the edge of the pill to central region to thereby heat the fuel and maintain it under pressure.

In accordance with another aspect of this invention, the groove(s) is narrow enough so that the fuel flowing through it remains under pressure and the "Lendenfrost" effect is avoided.

In accordance with still another aspect of the invention, the groove is spiral-shaped.

In accordance with yet still another aspect of the invention, the fuel heater of this invention is adapted to be in fitted between the tip of an injector and the nozzle plate in an injection engine.

BRIEF DESCRIPTION OF THE DRAWINGS

Other objects, advantages and details of this invention appear in the following detailed description of the preferred embodiments of the invention and the detailed description referring to the drawing. The drawing is a longitudinal section view through the end part of an injector system with a fuel heater of the present invention for use in an internal combustion engine.

DESCRIPTION OF THE PREFERRED EMBODIMENTS

The sole figure shows the construction and design of an injector system of the present invention for atomization of fuel. The injector system has an injector tip 1 with an insulation sleeve 2 disposed around injector tip 1, sealed off from the injector tap by means of an O-ring 3. A fuel supply line 4 carries fuel under pressure in the injector tip 1.

A fuel heater consists of a pill 5 made of material that exhibits a positive temperature coefficient (PTC) such as barium strontium-titanate. The pill 5 is preferably covered on both the top and bottom surfaces with respective heatsink members 6 and 7 having the properties of high heat conductivity.

A nozzle plate 8 is positioned below the bottom heatsink 7. The heater is securely held in place with the top portion directly adjacent injector tip 1 by means of springs 9 or the like acting against nozzle plate 8. A metal cap 10 encloses injector tip 1, insulation sleeve 2, heater and nozzle plate 8 by means of clamping fingers 11 or the like to form a unitary device. O-rings 12 and 13 provide the seal of the cap 10 relative to the insulation sleeve 2 and the nozzle plate 8.

An electrical supply line for supplying electric power to the PTC pill 5 is indicated by 14a and the ground line of the electrical circuit by 14b. Appropriate contacts are provided on pill 5 to carry the current.

In accordance with this invention, grooves 15 and 16 are disposed in both the bottom surface of top heatsink 6 and the top surface of bottom heatsink 7 respectively adjacent the top and bottom surface of pill 5. These grooves preferably are spiral in shape with the groove in top heatsink 6 extending from the center to the outer periphery, and the groove in bottom heat 7 extending from the outer periphery back to the center although other configurations could be used. Supply channel 4, as shown in the figure, opens at a point in line with a central inlet 17 in top heatsink 6. This central inlet is in fluid communication with spiral groove 15. A corresponding central outlet 19 is provided in bottom heatsink 7 in fluid communication with spiral groove 16. Additionally, spiral grooves 15 and 16 are in fluid communication with each other by way of a passage 20 at the outer edge of PTC pill 5. Lastly, nozzle channels 18 in nozzle plate 8 are positioned with an inlet portion in fluid communication with central outlet 19 and an outlet portion for discharging fuel from the injector assembly.

In operation, the injector system works as follows:

Liquid fuel under pressure flow through channel 4 to the center inlet 17 of top heatsink 6, and in turn, through groove 15 in a spiral path toward the outside of the pill 5. The PTC pill 5 is energized with electric current and heats the fuel while flowing in the spiral groove. From the outer part of spiral groove 15 the fuel still under pressure enters connecting passage 20 and then in turn the outer portion of spiral groove 16 in bottom heatsink 7. The fuel in spiral groove 16 is further heated still under pressure due to the narrow construction of the groove as it flows in groove 16 to central outlet 19. From central outlet 19, the heated fuel under pressure flows out of the injector assembly through channels 18 in nozzle plate 8, and immediately upon exiting changes into a gaseous state.

The temperature is controlled by the heating value of the PTC pill which has the properties of increasing its electrical resistance with temperature so that the temperature cannot exceed a certain value. The fuel is maintained under pressure by using a narrow groove to constrict the flow. Typically, the groove will have cross-sectional side dimensions between 10 and 100 microns although in certain applications the dimensions could be greater. Upon exiting the injector assembly, the constriction, and thus the pressure of the heated fuel, is relieved and it immediately changes from a liquid to a gaseous state. That is, the vaporization of the fuel occurs completely.

In a variant of the above described embodiment, the spiral grooves 15 and 16 are made in PTC pill 5 instead of heatsinks 6 and 7. It is also possible to provide both the heatsinks and PTC pill with spiral grooves.

In accordance with the present invention, the heat transfer surface in contact with the fuel is large and precisely directed to the fuel for minimal heat loss and wasting of power. Only the fuel is heated and not also surrounding air. Additionally, the heater can be manufactured separately and is easy to fit in existing injectors. The injector tip can also be supplied with the heater. The device, according to the invention, is excellent for a so-called ultra-low emission vehicle. Other shapes of grooves are also possible.

This invention has been described above with reference to the aforementioned embodiments. It is evident, however, that many alternatives, modifications and variations will be apparent to those skilled in the art in light of the foregoing description. Accordingly, it is intended to embrace all such alternatives, modifications and variations as fall within the spirit and scope of the appended claims.

We claim:

1. A fuel heater for heating liquid fuel under pressure in an internal combustion injection engine comprising a pill made of material with a positive temperature coefficient (PTC) having a top side and a bottom side surface with at least one of said top and bottom side surfaces covered by a heatsink, characterized in that at least one narrow groove is contained adjacent each of the top and bottom side surfaces in at least said PTC pill or said at least one heatsink so that the fuel supplied under pressure can flow in the at least one narrow groove at the top side surface of the pill from the central region towards the edge of the pill, and then into the at least one narrow groove at the bottom side surface of the pill from the edge of the pill to central region to thereby heat the fuel and maintain it under pressure.

2. A fuel heater according to claim 1 wherein said at least one narrow groove is in a spiral shape with cross-sectional side dimensions of about between 10 and 100 microns.

3. A fuel heater according to claim 1 wherein said fuel heater is part of a fuel injector assembly fitted between a tip portion of the injector and a nozzle plate which sprays fuel into the combustion chamber of the engine.

4. A fuel heater according to claim 3 wherein a spring means positioned on a top surface of the nozzle plate holds the fuel heater against the injector tip.

5. A fuel injector system for an internal combustion engine comprising an injector tip for supplying fuel under pressure to a nozzle plate in which a fuel heater is fitted between the injector tip and the nozzle plate, said fuel heater comprises a heater pill made of material with a positive temperature coefficient (PTC) having a top side and bottom side surface with said top side and bottom side surfaces covered by heatsink members, characterized in that at least one narrow groove is contained adjacent each of the top and bottom side surfaces in at least said PTC heater pill or said heatsink members so that fuel supplied under pressure from the injector tip will flow in the at least one narrow groove to the nozzle plate thereby heating the fuel to a prescribed temperature and maintaining it under pressure.

6. A fuel injector system according to claim 5 wherein said at least one groove is in a spiral shape with cross-sectional side dimensions of about between 10 and 100 microns and extends from the central region toward the edge adjacent the top surface of the heater pill and then from the edge back to the central region adjacent the bottom surface of the heater pill.

7. A fuel injector system according to claim 5 wherein a spring means is positioned on a top surface of the nozzle plate to hold the fuel heater against the injector tip.

8. A fuel injector system according to claim 5 wherein said nozzle plate is held in place by a cap member.

* * * * *